(12) United States Patent
Lam et al.

(10) Patent No.: US 8,156,072 B2
(45) Date of Patent: Apr. 10, 2012

(54) METHOD FOR FAST RECONSTRUCTION OF CONTENT INFORMATION

(75) Inventors: Tak Wing Lam, Kowloon (HK); Sai Fan Chan, Kowloon (HK)

(73) Assignee: Thomson Licensing, Boulogne, Billancourt (FR)

( * ) Notice: Subject to any disclaimer, the term of this patent is extended or adjusted under 35 U.S.C. 154(b) by 0 days.

(21) Appl. No.: 10/566,875

(22) PCT Filed: Jul. 24, 2004

(86) PCT No.: PCT/EP2004/008327
§ 371 (c)(1),
(2), (4) Date: Sep. 18, 2006

(87) PCT Pub. No.: WO2005/015562
PCT Pub. Date: Feb. 17, 2005

(65) Prior Publication Data
US 2007/0198453 A1 Aug. 23, 2007

(30) Foreign Application Priority Data
Aug. 7, 2003 (EP) .................................. 03291972

(51) Int. Cl.
*G06F 7/00* (2006.01)
(52) U.S. Cl. .................. 707/602; 707/705; 707/781
(58) Field of Classification Search ............ 707/602
See application file for complete search history.

(56) References Cited

U.S. PATENT DOCUMENTS

| 5,880,388 A | 3/1999 | Kajiyama et al. |
| 6,034,925 A | 3/2000 | Wehmeyer |
| 6,252,831 B1 | 6/2001 | Wehmeyer |
| 6,388,960 B1 | 5/2002 | Furukawa et al. |
| 6,516,337 B1* | 2/2003 | Tripp et al. .................. 709/202 |
| 6,976,053 B1* | 12/2005 | Tripp et al. .................. 709/202 |
| 2002/0073106 A1* | 6/2002 | Parker et al. ................ 707/200 |
| 2002/0184651 A1 | 12/2002 | Matsushita |
| 2003/0135464 A1* | 7/2003 | Mourad et al. ................ 705/50 |
| 2005/0055578 A1* | 3/2005 | Wright et al. ................ 713/201 |

FOREIGN PATENT DOCUMENTS

| EP | 0834876 | 4/1998 |
| JP | 02-206820 A | 8/1990 |
| JP | 8306168 A | 11/1996 |
| JP | 2001008158 | 1/2001 |
| JP | 2002358761 | 12/2002 |
| WO | 0186652 A1 | 11/2001 |

OTHER PUBLICATIONS

Dik Lun Lee: "Performance Analysis of Key-Partitioned Signature Files" Proceedings of the Australian Joint Conference on Artificial Intelligence, Jul. 17, 1998, pp. 1-21.

* cited by examiner

*Primary Examiner* — Fazlul Quader
(74) *Attorney, Agent, or Firm* — Jeffrey D. Carter

(57) ABSTRACT

A method for the fast reconstruction of content information of a recording medium. The method includes determining a signature of the recording medium, the signature having two or more elements; comparing the signature with two or more signatures stored in a content database; and retrieving associated content information from the content database if the signature matches a signature stored in the content database.

9 Claims, 3 Drawing Sheets

METHOD FOR FAST RECONSTRUCTION OF CONTENT INFORMATION

This application claims the benefit, under 35 U.S.C. §365 of International Application PCT/EP04/008327, filed Jul. 24, 2004, which was published in accordance with PCT Article 21(2) on Feb. 17, 2005 in English and which claims the benefit of European patent application No. 03291972.2, filed Aug. 7, 2003.

The present invention relates to a method for the fast reconstruction of content information of a recording medium, and to an apparatus for reading from and/or writing to recording media using such method.

Nowadays multi-format players for optical disks support optical disks with multimedia data content. Supported data file types range from MP3 audio files via JPEG photos to MPEG4 video clips. The files are usually stored in a file system on the optical disk in a format designed for optical data retrieval. Each time an optical disk is inserted in the player, the device initially reconstructs content information, e.g. the file system, and possibly establishes a database before being able to access the multimedia files. Such a reconstruction of the content information and/or an establishment of a database is also needed in other circumstances, e.g. in a disk changer in which one of a plurality of disks is selected and transferred into a playback position, or when a portable player wakes up from a power down mode.

The time it takes to reconstruct the content information depends, to a large extent, on the number of files on the recording medium, i.e. in the file system. The larger the number of files, the longer it takes to reconstruct the content information. Reducing this time duration is very convenient for a user.

U.S. Pat. No. 6,034,925 discloses a method for identifying the content of a recording medium, whereby a characteristic profile of the medium is determined and compared with a plurality of profiles stored in a local or a remote database. In the database a content index comprising title and artist information is stored together with the corresponding profile. This content index is used when the profile of the specific medium is found in the database. The title and artist information is then displayed during playback of the content.

It is an object of the invention to provide a method for the fast reconstruction of content information of a recording medium.

According to a first aspect of the invention this object is achieved by a method for reconstructing content information of a recording medium comprising the steps of:
   determining a signature of the recording medium, the signature comprising a plurality of elements;
   comparing the signature with a plurality of signatures stored in a content database; and
   retrieving associated content information from the content database if the signature matches a signature stored in the content database.

Preferably the content information is a file system, which contains the position of the content on the recording medium. The method checks whether the specific recording medium has been encountered recently in a playback device. For this purpose a signature of the recording medium is determined, which is a feature vector defined in such a way that it provides a robust unique identifier for the recording medium. The signature is able to discriminate between recording media having only minor differences in data content. The signature is compared with signatures in a database. Only if the same physical recording medium with the same content (file-system) is present, a match is found. In the prior art, in contrast, different physical recording media with the same content do all result in the same match. If a match is found a file system associated with the stored signature is retrieved from the database and used for the current recording medium. This increases the start-up speed dramatically when a recording medium is inserted into a playback or recording device, provided that the recording medium has recently been inserted into the device.

Favourably, the step of comparing the signature with a plurality of signatures stored in a content database comprises evaluating the mathematical or logical distances between the determined signature and the signatures stored in the content database. If a distance with a value of zero is encountered, this is considered as a match. If, on the other hand, no distance with a value of zero is encountered, the system considers that no match exists in the files system database.

According to another aspect of the invention a method for reconstructing content information of a recording medium comprises the steps of:
   determining a first part of a signature of the recording medium, the signature comprising a plurality of elements;
   comparing the first part of the signature with a corresponding part of a plurality of signatures stored in a content database;
   determining a further part of the signature of the recording medium if the first part of the signature matches at least one signature stored in the content database;
   comparing the further part of the signature with a corresponding part of the plurality of signatures stored in the content database; and
   retrieving an associated file system from the content database if the signature matches a signature stored in the content database.

In this approach a hierarchical structure is employed. The order of the elements of the signature is arranged in such way that the first m elements are evaluated quickly, while the further elements may take a longer time to determine. This allows a very fast determination whether a recording medium has not yet been stored in the content database. Only if the first m elements do not allow to exclude that a recording medium has previously been encountered, the further elements are considered.

Advantageously, in the comparing steps a negative progressive search approach is employed, in which the elements of the determined signature are compared with the corresponding elements of the signatures stored in the content database one at a time, wherein of every element of the signature may yield a negative search result.

The elements of the signature are defined such that if a "No Match" between an element in the signature and the same element of all the signatures in the signature list is encountered, then a "No Match" is concluded categorically. This speeds up the process as the further elements do no longer need to be considered.

Favourably, the method further comprises the steps of:
   reconstructing the content information from the recording medium if the determined signature does not match a signature stored in the content database; and
   storing the reconstructed content information and the determined signature in the content database.

The solution described above with reference to the prior art requires a manual intervention by a user to add artist and title information to a database. Under the same situation, the method according to the invention generates the file system automatically and adds it to the database together with the associated signature.

Advantageously, an apparatus for reading from and/or writing to recording media uses a method according to the invention for reconstructing content information of the recording medium. Such an apparatus is very convenient for a user since the start-up procedure needs less time if the recording medium has previously been inserted in the apparatus.

Favourably, the apparatus performs the reconstruction of the content information of the recording medium after insertion of the recording medium, after transferal of the recording medium into a playback position, or after wake up from a power down mode. These are the main situations in which a reconstruction of the content information becomes necessary.

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures.

Figure 3:
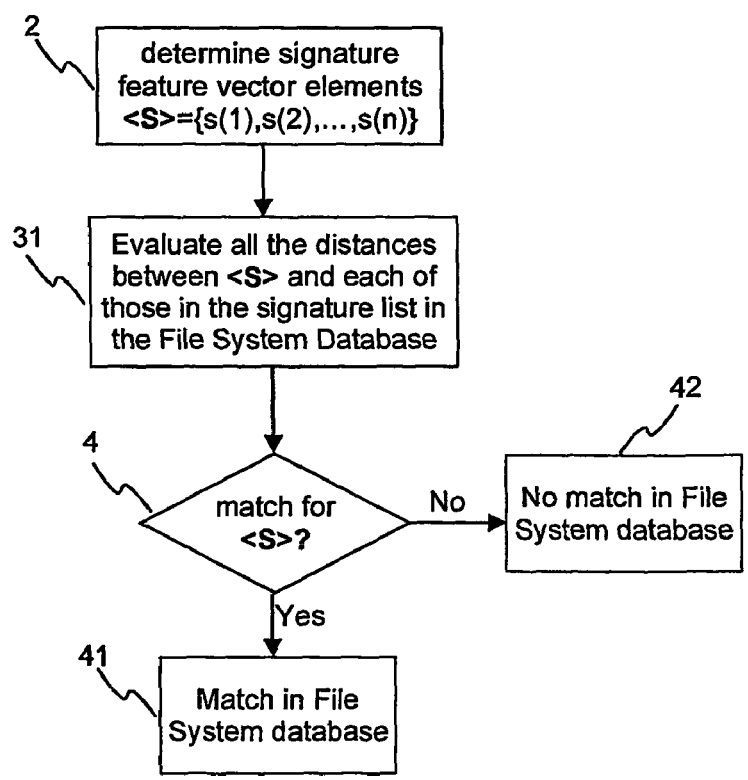
Figure 4:
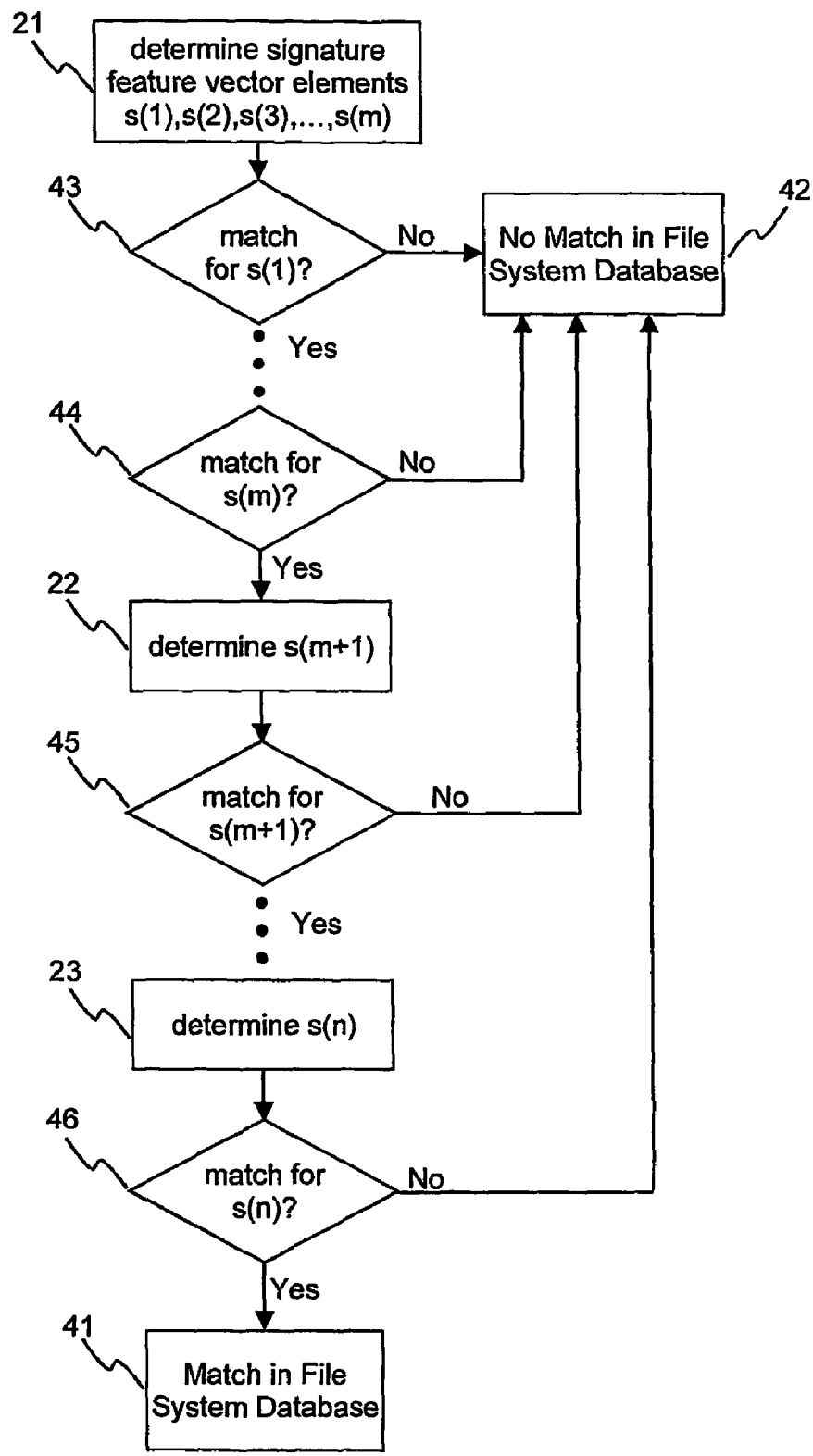

FIG. 3 schematically shows a first query of the file system database for a matching signature; and FIG. 4 schematically shows a second query of the file system database for a matching signature.

Figure 1:
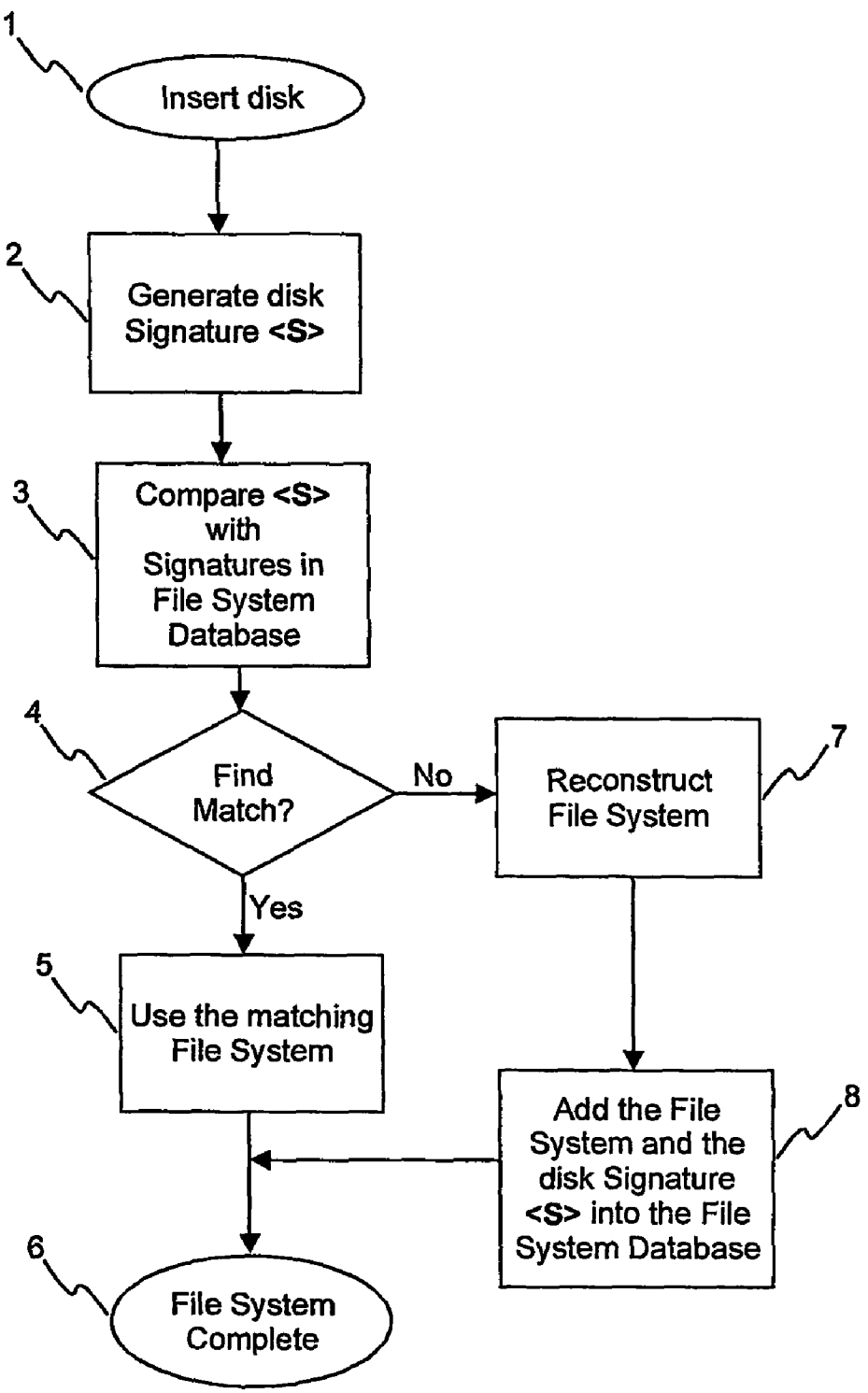
FIG. 1 shows a method according to the invention for the fast reconstruction of a file system of a recording medium.

In FIG. 1 a method according to the invention for the fast reconstruction of the content information 11 of a recording medium inserted into an apparatus for reading from and/or writing to recording media is shown. In the following the invention is explained for optical disks. However, the invention is also applicable to other types of recording media. Furthermore, reference is made to a file system as an example for content information.

When in a step 1 a disk is inserted into a loader of an optical playback and/or recording device, either manually for a single disk device or through the selection mechanism of a disk changer, in a step 2 a signature <S> 10 is generated. The signature 10 has the form of a feature vector, so that, $$<S>=\{s(1), s(2), s(3), \ldots, s(n)\}.$$

Each element in the feature vector $\{s(1), s(2), s(3), \ldots, s(n)\}$ is a single measurement of a feature based on the pattern of the data content on the disk.

Figure 2:
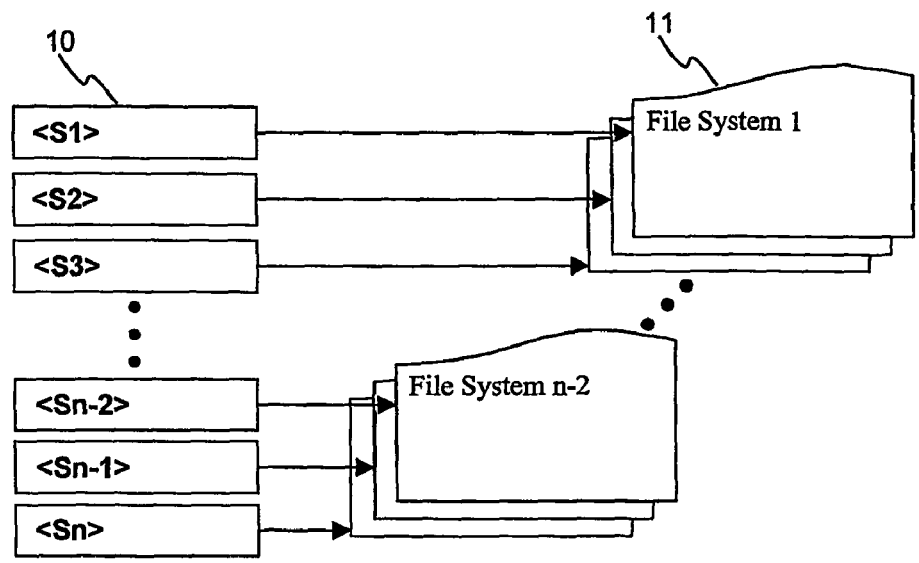
FIG. 2 shows a general structure of a file system database.

The signature 10 is then compared in a step 3 with a signature list in a file system database of the playback and/or recording device. Each signature in the list is associated to a file system 11, as shown in FIG. 2. The file system database is preferably stored in a non-volatile memory.

If in the next step 4 no matching signature 10 is found, the file system 11 of the disk is reconstructed 7 from the data retrieved from the disk. This new file system 11 and the associated signature 10 are then added 8 to the file system database. On the other hand, if in the step 4 a match is found, the file system 11, which is associated to the matching signature 10, is retrieved from the file system database and used as the file system 11 of the disk. In both cases the procedure ends 6 when the complete file system 11 has been retrieved.

FIG. 2 shows the general structure of a file system database. Each signature 10 in the file system database is associated to the corresponding file system 11.

The signature feature vector 10 is defined in such a way that it provides a robust unique identifier for a disk. Furthermore, it should be able to discriminate between disks having only minor differences in data content. Preferably the signature 10 also handles multi-session disks and uses features, which can be measured accurately and quickly. In order to perform the determination of the signature and the comparison with the file system database within a reasonable time, the length of the feature vector preferably is moderate.

Possible elements for the determining the feature vector comprise:
Disk Status:
   Open/Closed disk
   Number of sessions
   Number of tracks in each session
Timing Information:
   Lead-in time of each session
   Lead-out time of each session
   Q-Code information of each data track shown in the table of content
   Total time of each session calculated from the timing information in the table of content
Data Integrity:
   Data Checksums of Specific Track Preferably the data checksum of the last track on the disk is analysed. The data checksum of the specific track is the arithmetic sum of a pre-defined area inside the data track. Depending on the implementation of the method, the pre-defined area is the beginning, the middle or the end of the track. The size of the area is one sector or more. The checksum preferably is 16 bit or 32 bit.

Of course, other features of the recording media can also be used for determining the feature vector.

Different approaches exist for querying if the input signature <S> matches one of the signatures 10 inside the File System Database.

FIG. 3 schematically shows a first approach for querying the file system database for a matching signature. In a step 2 the signature <S> is constructed by evaluating the different feature vector elements. The distances between the signature vector <S> and each of the signatures 10 in the signature list of the file system database are then evaluated 31. If in a step 4 a distance with a value of zero is encountered, this is considered as a match 41. If, on the other hand, no distance with a value of zero is encountered in the step 4, the system considers 42 that no match exists in the files system database.

Another possible approach for querying the file system database for a matching signature is shown in FIG. 4. A hierarchical structure is employed in this approach. The order of the feature vector elements of the signature <S> is arranged so that the first m elements are evaluated quickly, while the elements from m+1 to n may take a longer time to determine. All elements are defined such that if there is one "No Match" between an element in the signature <S> and the same element of all the signatures 10 in the signature list, then a "No Match" is concluded categorically 42. Elements 1 to m of <S> are determined first 21, then a query for a match is performed one element at a time 43, 44. On the other hand, for the elements m+1 to n, each element is determined separately 22, 23 and queried for a match immediately 45, 46. If a signature 10 is found in the signature list, which is equal to the determined signature in all elements, this signature is considered 41 a match.

The invention claimed is:

1. A method implemented in an apparatus for playback of multimedia data content from a removable optical disk for retrieving a file system of the removable optical disk, the file system indicating physical positions of content on the removable optical disk, the method comprising:

upon insertion of the removable optical disk into the apparatus, determining a signature of the removable optical disk by measuring features based on a data pattern stored on the removable optical disk, the signature including a plurality of elements;

comparing the signature with a plurality of signatures stored in a content database; and retrieving the associated file system indicating the physical position of the content on the removable optical disk from the content database if the signature is equal to a signature stored in the content database.

2. The method according to claim 1, wherein the comparing the signature with a plurality of signatures stored in the content database includes evaluating the distances between the determined signature and the signatures stored in the content database.

3. The method according to claim 1, wherein the determining the signature of the removable optical disk and comparing the signature with the plurality of signatures includes:

determining a first part of the signature including a first part of the plurality of elements;

comparing the first part of the signature with corresponding parts of the plurality of signatures stored in the content database;

determining a further part of the signature if the first part of the signature is equal to the corresponding part of at least one signature stored in the content database; and comparing the further part of the signature with corresponding parts of the plurality of signatures stored in the content database.

4. The method according to claim 1, wherein, in the comparing the signature with the plurality of signatures stored in the content database, a negative progressive search approach is employed, in which the elements of the determined signature are compared with the corresponding elements of the signatures stored in the content database one at a time, wherein a negative search result is concluded if there is no match between one element of the signature and the same element of all the signatures stored in the content database.

5. The method according to claim 1, further comprising:

obtaining the file system from the removable optical disk if the determined signature is not equal to a signature stored in the content database; and storing the obtained file system and the determined signature in the content database.

6. The method according to claim 1, wherein the signature is unique for every removable optical disk.

7. The method according to claim 1, wherein the elements of the signature are selected from a disk status such as open or closed disk, number of sessions or number of tracks in each session, from timing information such as a lead-in time of each session, a lead-out time of each session, a total time of each session or subcode information of each track, or from data integrity such as data checksums of specific tracks.

8. An apparatus for playback of multimedia data content from a removable optical disk, wherein the apparatus includes at least one element configured for retrieving a file system of the removable optical disk, the file system indicating physical positions of content on the removable optical disk, by performing steps comprising:

upon insertion of the removable optical disk into the apparatus, determining a signature of the removable optical disk by measuring features based on a data pattern stored on the removable optical disk, the signature including a plurality of elements;

comparing the signature with a plurality of signatures stored in a content database; and retrieving the associated file system indicating the physical positions of the content on the removable optical disk from the content database if the signature is equal to a signature stored in the content database.

9. The apparatus according to claim 8, wherein the apparatus is configured to perform the retrieval of the file system of the removable optical disk after an occurrence of a condition selected from a group consisting of insertion of the removable optical disk, transferral of the removable optical disk into a playback position, and wake up from a power down mode.

\* \* \* \* \*